United States Patent [19]

Shimano

[11] 4,371,064
[45] Feb. 1, 1983

[54] DRIVE AND BRAKE DEVICE FOR A BICYCLE

[75] Inventor: Keizo Shimano, Sakai, Japan

[73] Assignee: Shimano Industrial Company Limited, Osaka, Japan

[21] Appl. No.: 176,807

[22] Filed: Aug. 11, 1980

[30] Foreign Application Priority Data

| Aug. 28, 1979 [JP] | Japan | 54-110141 |
| Oct. 17, 1979 [JP] | Japan | 54-134352 |
| Mar. 31, 1980 [JP] | Japan | 55-42701 |
| May 15, 1980 [JP] | Japan | 55-64714 |
| May 15, 1980 [JP] | Japan | 55-64715 |

[51] Int. Cl.³ .......................................... F16D 67/02
[52] U.S. Cl. ...................................... 192/6 A; 474/80
[58] Field of Search .................... 192/6 A, 6 R, 5; 280/236, 238; 474/78, 80, 83

[56] References Cited

U.S. PATENT DOCUMENTS

| 2,572,182 | 10/1951 | Mueller | 192/6 R |
| 3,506,100 | 4/1970 | Tomozawa | 192/6 A |
| 3,847,028 | 11/1974 | Bergles | 474/80 |
| 3,870,134 | 3/1975 | Anthamatten | 192/6 A |
| 3,942,615 | 3/1976 | Craig | |
| 4,194,409 | 3/1980 | Nagano | 474/80 |
| 4,215,872 | 8/1980 | Clark | 474/80 |
| 4,277,077 | 7/1981 | Ozaki | 474/80 X |

FOREIGN PATENT DOCUMENTS 7221  1/1907  France.

*Primary Examiner*—George H. Krizmanich
*Attorney, Agent, or Firm*—Stevens, Davis, Miller & Mosher

[57] ABSTRACT

A drive and brake device for a bicycle, comprising a rear wheel hub having a plurality of driving gears, a coaster brake mechanism, and a derailleur having a chain-switching pulley. A guide pulley is provided at a fixing member carrying the derailleur, and guides a driving chain to the chain-switching pulley; a braking driving member rotatable integrally with the guide pulley when rotating reversely, is disposed coaxially with the guide pulley; and between the driving member and a braking driven member supported to a brake actuator at the coaster brake mechanism is interposed a transmitting mechanism for transmitting operation of the driving member to the driven member.

11 Claims, 14 Drawing Figures

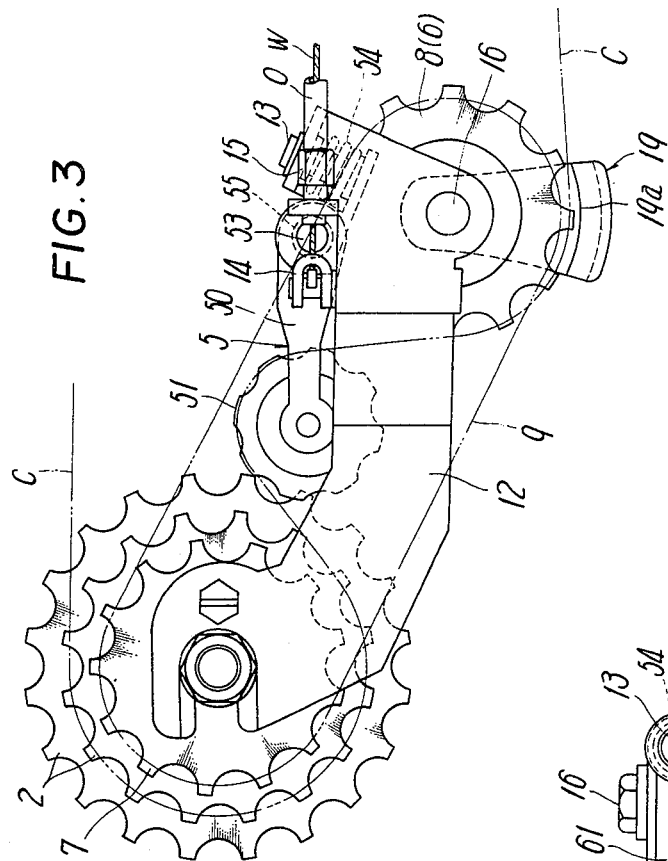
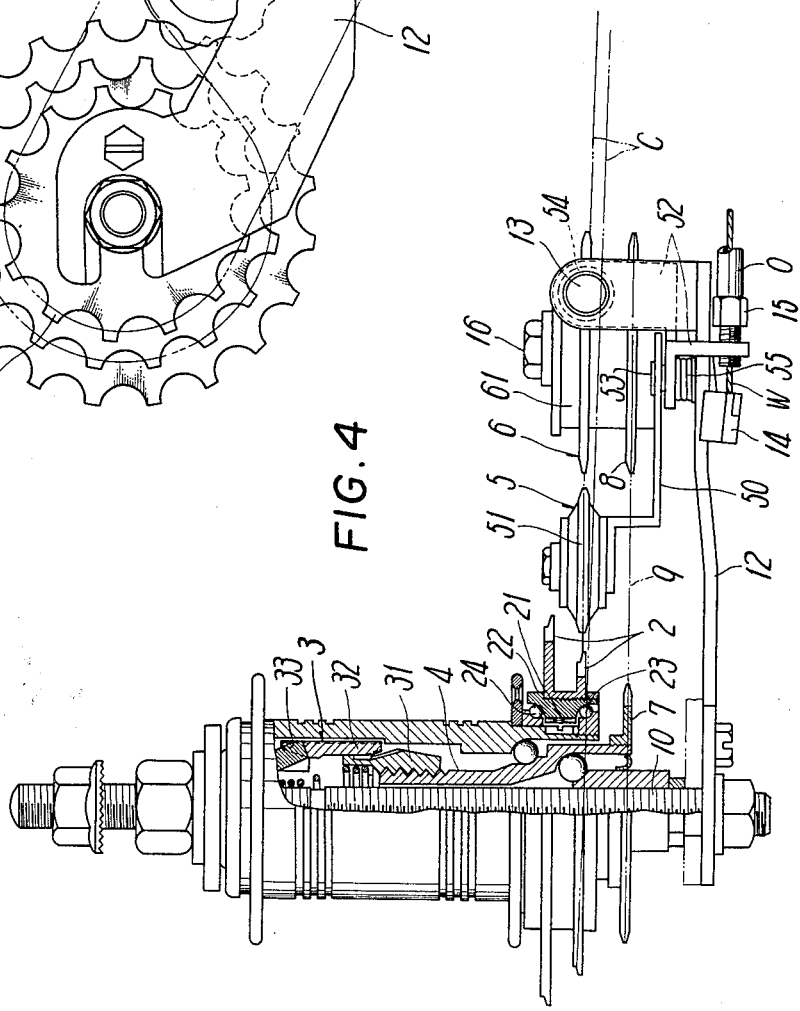

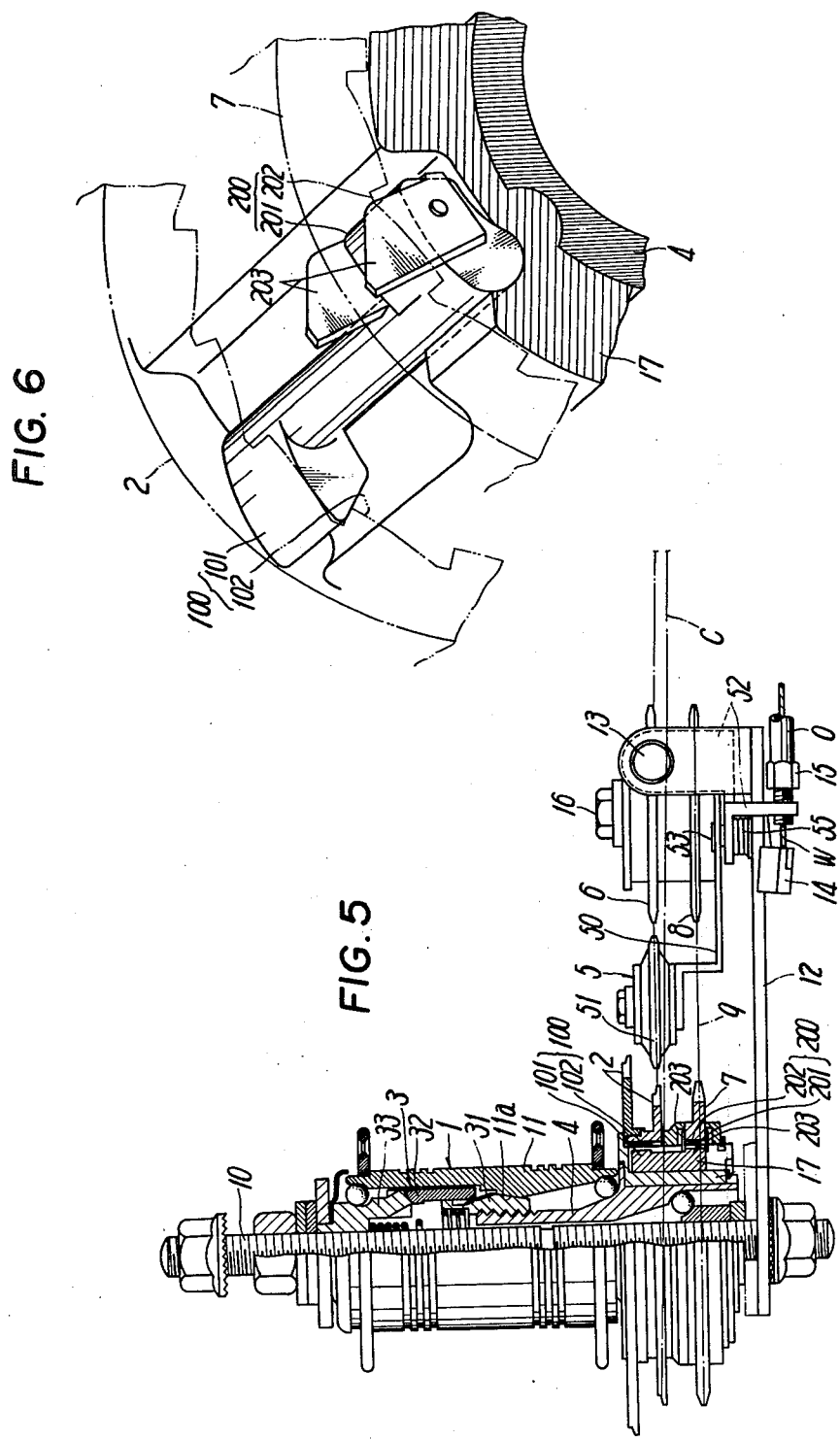

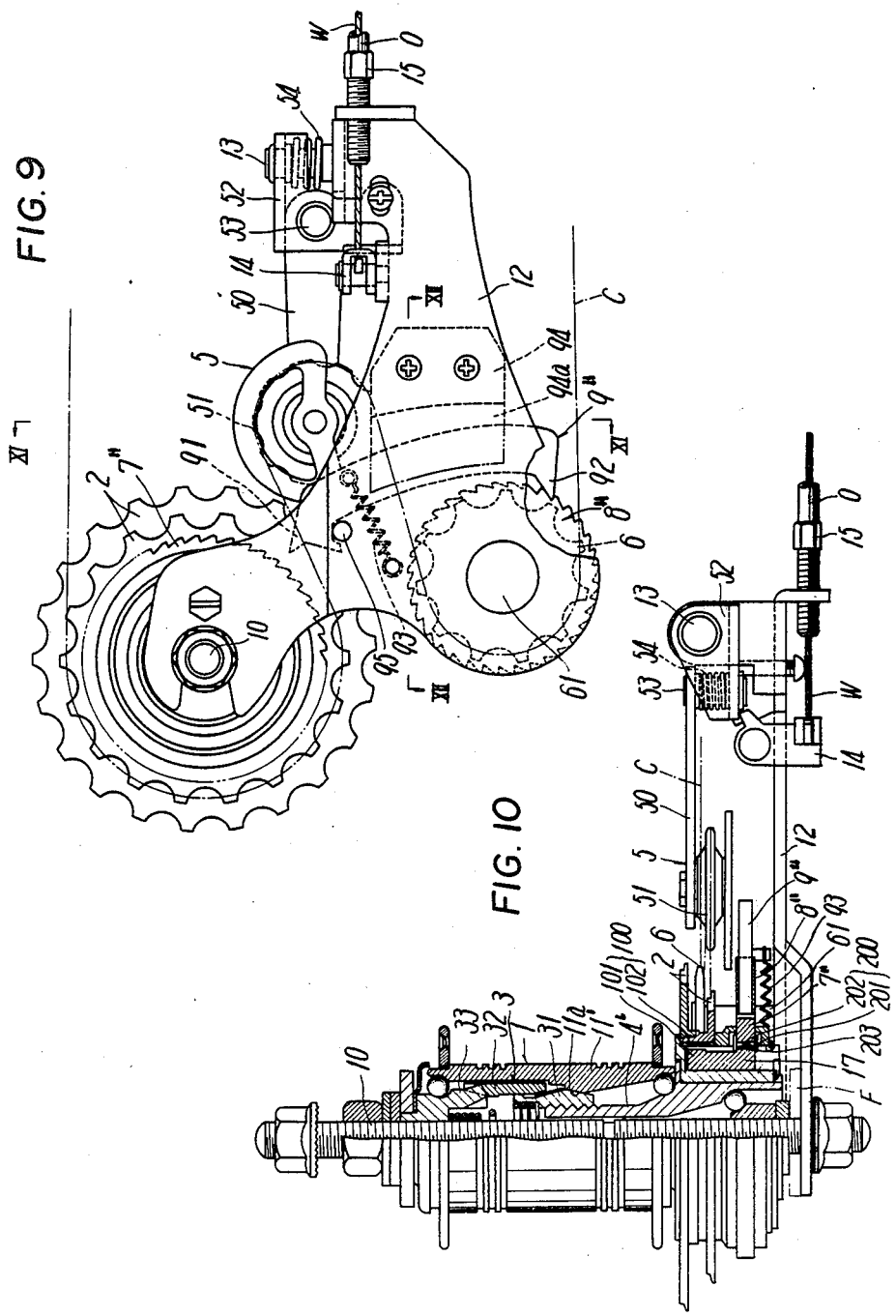

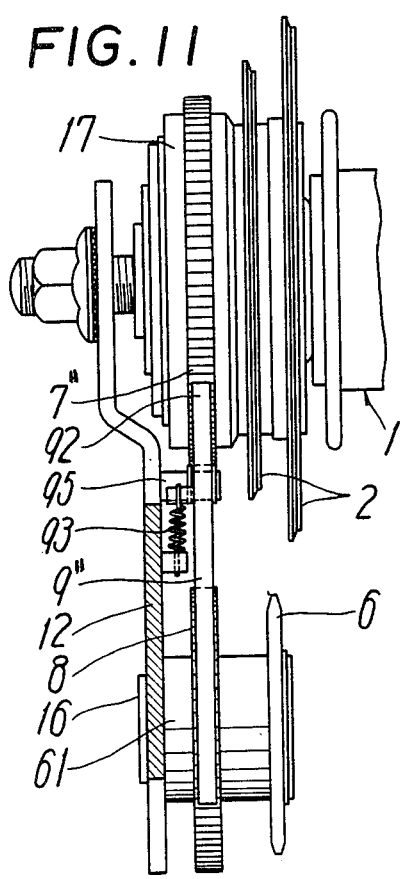
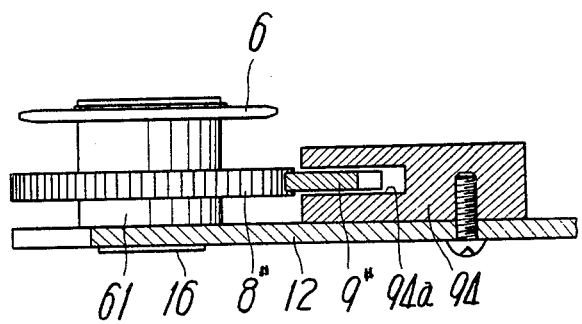
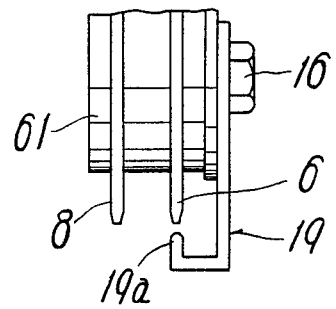
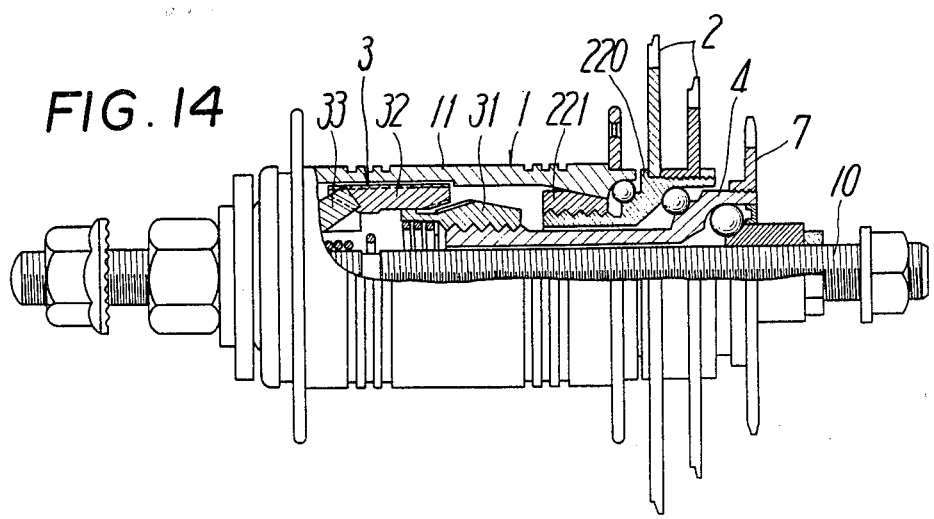

DRIVE AND BRAKE DEVICE FOR A BICYCLE

FIELD OF THE INVENTION

This invention relates to a drive and brake device for a bicycle, and more particularly to a drive and brake device for a bicycle, which comprises the combination of a rear wheel hub, having a plurality of driving gears and a coaster brake mechanism, with a derailleur for switching a drive chain to a desired one of the driving gears, so that one front gear of the bicycle, when normally rotated by normal-pedalling, drives a rear wheel by way of a driving chain, and the front gear, when reversely rotated by back-pedalling, reversely rotates to brake the rear wheel.

BACKGROUND OF THE INVENTION

Conventionally, a drive and brake device for a bicycle has been proposed which is provided with a coaster brake mechanism housed within a rear wheel hub, a plurality of driving rear gears provided on a brake actuator for actuating the coaster brake mechanism, and a derailleur having two pulleys and being provided in the vicinity of the driving gears, so that a drive chain is stretched across the front gear and one of the driving rear gears and switched to a desired one of the rear gears through the derailleur. The front gear is normally rotated to drive the rear hub at a given speed change ratio, and reversely rotates to allow the rear gears to reversely rotate to thereby actuate the brake actuator for exerting the braking action.

In the above device, a tension spring is provided at the derailleur to keep the chain always in constant tension even when it is switched to the rear gear of a different diameter. However, when the front gear is reversely rotated for exerting the braking action, the chain, between the pulley and the front gear, is tensioned on the tight side or drive side, whereby a changeover cage carrying the pulleys swings to the utmost extent against the tension spring, and thereafter the rear gear reversely rotates.

Accordingly, during the swinging motion of the changeover cage, no rear gear reversely rotates even with reverse rotation of the front gear, thereby creating a delay of the braking effect. The utmost swinging motion of the cage applies an excessive force to the derailleur to lead to a breakdown therein. Also, since the respective rear gears are reversely rotated for exerting the braking action, a rotary angle of the front gear, in other words, an angle of revolution of a crank arm, differs due to different gear ratios, thereby making it difficult to exert a stable braking action.

Furthermore, the utmost swinging motion of the changeover cage during the braking action causes a slack in the chain on the drive side between the rear gear and the front gear during the normal rotation thereof, whereby the front gear, in transition from the braking condition to driving condition, is in lost motion to the extent of the chain's slack, resulting in the chain disengaging from the front gear.

Conventionally, a device has been proposed which is provided with a front braking gear at a crank shaft carrying the front gear, a rear braking gear mounted on the rear hub, and a braking chain stretched across the front and rear braking gears, so that the front braking gear is rotated together with the front gear by back-pedalling so as to rotate the rear braking gear through the braking chain, thus exerting the braking action. Such a device, however, additionally requires the braking gears and braking chain, resulting in a complicated construction which is expensive to produce.

SUMMARY OF THE INVENTION

This invention has been designed to overcome the aforesaid problems. An object of the invention is to provide a drive and brake device which requires no front braking gear and braking chain as in the conventional device and eliminates slack created in the chain during the braking action, thereby preventing the lost motion of the front gear, drop-out of the chain from the front gear, and a delay in braking effect. Furthermore, no excessive force is applied to the derailleur during the braking action and a stable braking effect is always performable at a constant rotary angle of the front gear even when the chain is carried on the rear gear having a different gear ratio.

The drive and brake device of the invention comprises a rear wheel hub provided with a plurality of driving gears and with a coaster brake mechanism including a brake actuator, and a derailleur for switching the driving chain to a desired one of the driving gears, the brake actuator being provided with a braking driven member. A fixing member supporting the derailleur carries a guide pulley for guiding the driving chain to a chain-switching pulley at the derailleur and a braking driving member disposed coaxially with the guide pulley and operable together therewith during back-pedalling. Between the braking driving member and the braking driven member is interposed a transmitting mechanism for transmitting the operation of the braking driving member to the braking driven member, so that the driving chain travels backwards by back-pedalling to rotate the braking driving member together with the guide pulley, and the rotation of the braking driving member is transmitted to the braking driven member through the transmitting mechanism, thereby reversely rotating the brake actuator, thus actuating the coaster brake mechanism to brake the rear wheel of the bicycle.

Since the driving chain stretched from the front gear is once received by the guide pulley supported to the fixing member and then engages with a desired one of the driving gears through the chain-switching pulley, the reversing force of the front gear resulting from back-pedalling is made to be transmitted to the braking driven member through the chain-switching pulley, first to the guide pulley and then from the braking driving member cooperative therewith to the braking driven member by way of the transmitting mechanism independent of the driving chain.

Therefore, no slack in the chain is created by the utmost swinging motion of the chain-switching pulley when exerting the braking action, thereby preventing lost motion of the front gear and a drop-out of the chain from the front gear. Furthermore, the reverse rotation of the braking driven member simultaneous with that of the front gear enables a quick braking effect without delay, and a constant rotary angle of the front gear for the braking action regardless of different gear ratios enables a stable braking action.

The reversing force of the front gear, as described above, is transmitted through the drive chain to the guide pulley supported to the fixing member, and actuates the braking driving member, whereby the extra braking front gear and long braking chain are not necessary, but the transmitting mechanism only is provided between the braking driving and driven members. The braking driving member can be disposed in proximity to the driven member, thereby simplifying the construction of the transmitting mechanism.

In addition, the transmitting mechanism may employ a chain, gear or interlocking member having pawls.

When the chain is used for the transmitting mechanism, the braking driving member and driven member comprise chain gears, and the chain is smaller in length.

When the gear is used, the braking driving and driven members comprise gears, and one intermediate gear is interposed between both the gears, thereby ensuring transmission of the reverse rotation of the guide pulley to the braking driven member and facilitating an assembly of the device.

Furthermore, when the interlocking member is used, the braking driving and driven members are formed of ratchet wheels respectively. The interlocking member, when the guide pulley rotates in reverse, moves to engage at its pawls with the ratchet wheels respectively, thereby reliably transmitting the reverse rotation of the guide pulley to the braking driven member for exerting the braking effect.

BRIEF DESCRIPTION OF THE DRAWINGS

FIG. 3 is an enlarged side view thereof, FIG. 4 is a partially cutaway enlarged plan view of the FIG. 1 embodiment, FIG. 5 is a partially cutaway enlarged plan view, corresponding to FIG. 4, of a modified embodiment of the invention, FIG. 6 is an enlarged perspective view of a pawl mounting portion at a unidirectional rotating transmitting mechanism in the FIG. 5 embodiment, FIG. 9 is a side view, corresponding to FIG. 3, of still another modified embodiment of the inveniton, FIG. 10 is a partially cutaway plan view, corresponding to FIG. 4, of the FIG. 9 embodiment, FIG. 11 is a sectional view taken on the line XI—XI in FIG. 9, FIG. 12 is a sectional view taken on the line XII—XII in FIG. 9, FIG. 13 is a partly front view of a guide pulley, explanatory of a chain holder attached thereto, and FIG. 14 is a partially cutaway front view of only a rear wheel hub of a further modified embodiment of the inveniton.

DETAILED DESCRIPTION OF THE INVENTION

Figure 1:
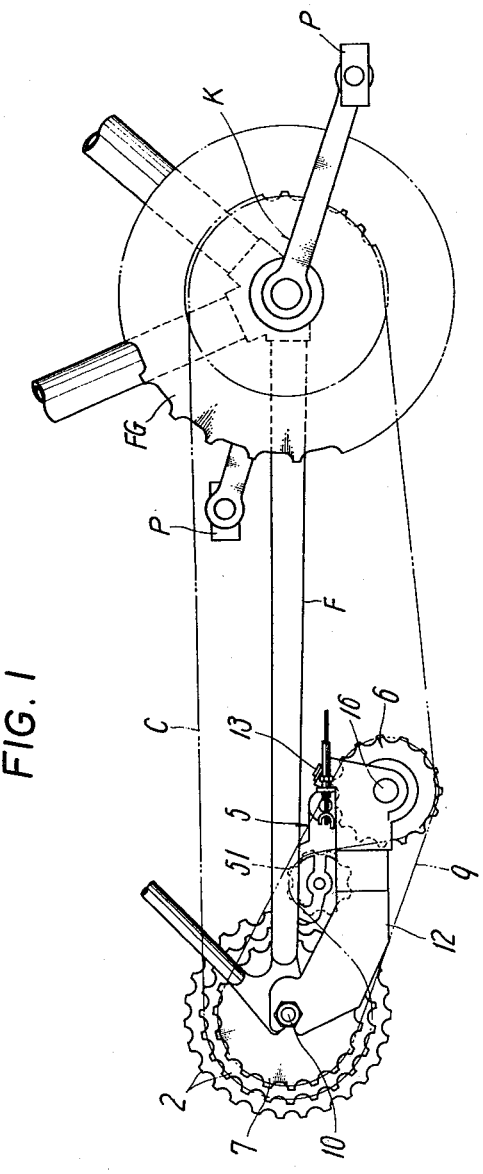
FIG. 1 is a schematic side view of an embodiment of a drive and brake device of the invention.

The drive and brake device of the invention basically comprises a rear wheel hub 1 provided with a plurality of driving gears 2 and with a coaster brake mechanism 3 including a brake actuator 4, a derailleur 5 for switching a driving chain C to a desired one of the gears 2, a guide pulley 6 for guiding the chain C to a chain-switching pulley 51 at the derailleur 5, a braking driven member 7 supported to the brake actuator 4 at the coaster brake mechanism 3, a braking driving member 8 operable together with the guide pulley 6 when reversely rotated, and a transmitting mechanism 9 transmitting the operation of driving member 8 to the driven member 7.

The rear wheel hub 1 is provided with a hub shaft 10 fixed to the bicycle frame F and a hub shell 11 supported rotatably to the hub shaft 10, the hub shell 11 housing therein the coaster brake mechanism 3.

Referring to FIGS. 1 through 4, the driving gears 2 are supported to the hub shell 11 in relation of being freely rotatable counterclockwise in FIG. 1 through a unidirectional rotation transmitting mechanism 21 comprising ratchet teeth and pawls. In detail, the driving gears 2 are fixed onto a cylindrical driving member 22 which is supported rotatably onto the hub shell 11 through bearings 23 and 24, and the unidirectional rotation transmitting mechansism 21 is provided between the driving member 22 and the hub shell 11, so that the unidirectional rotation of driving gear 2 is transmitted to the hub shell 11 through the driving member 22.

Figure 2:
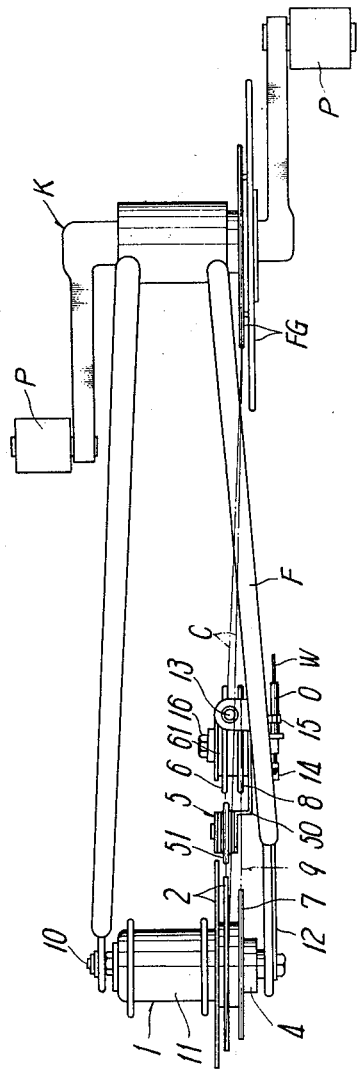
FIG. 2 is a plan view of the FIG. 1 embodiment.

Between the one driving gear 2 and one front gear FG at the bicycle is stretched the drive chain C as shown in FIGS. 1 and 2. Pedals P at a gear crank means K including the front gears FG rotate normally (clockwise in the drawings) to drive the rear wheel hub 1 through the driving gear 2, thus driving the rear wheel.

The drive chain C stretched across the front gear FG and the driving gear 2, is carried on the guide pulley 6, the chain-switching pulley 51, and then the one driving gear 2, and is switched by the derailleur 5 to a desired one of driving gears 2 to thereby drive it in the prescribed gear ratio.

The coaster brake mechanism 3, as shown in FIG. 4, comprises a clutch cone 31 screwable with the brake actuator 4, brake shoes 32, and a brake cone 33 fixed to the bicycle frame (not shown). The brake actuator 4 reversely rotates to axially move the clutch cone 31 toward the brake shoes 32 so that the brake shoes 32 in engagement with the brake cone 33 are pressed onto the inner surface of hub shell 11, thus braking the hub shell 11.

The derailleur 5 is provided in proximity to the driving gears 2 through a plate-like fixing member 12 fixed to the bicycle frame F. The chain-switching pulley 51, which switches the chain C to a desired one of driving gears 2, is supported rotatably to a changeover cage 50. The changeover cage 50 is supported swingably through a horizontal shaft 53 to a support member 52 which is supported swingably to the fixing member 12 through a vertical shaft 13. A return spring 54 is interposed between the fixing member 12 and the support member 52, and a tension spring 55, between the support member 52 and the changeover cage 50. A control wire W is pulled to swing the derailleur 5 around the vertical shaft 13 to thereby switch the drive chain C to a desired one of driving gears 2. The changeover cage 50 is biased always upwardly around the horizontal shaft 53 through the tension spring 55, thus applying constant tension to the chain C.

The control wire W is fixed to a wire fixture 14 mounted on the fixing member 12 and an outer sheath O guiding the wire W is supported to a holder 15 mounted on the support member 52, the outer sheath O, when the wire W is pulled, moving relative thereto to thereby swing the support member 52 around the vertical shaft 13.

The guide pulley 6 has a cylindrical support 61 supported rotatably to a support shaft 16 fixed to the fixing member 12, guides the chain C to the chain-switching pulley 51 at the derailleur 5, and rotates normally or reversely following travel of drive chain C. The reverse rotation of guide pulley 6 is transmitted to the braking driving member 8 to actuate the braking driven member 7 by way of the transmitting mechanism 9, thereby reversely rotating the brake actuator 4 for exerting the braking action.

In a case where the braking driven member 7 is fixed to the brake actuator 4, the braking driving member 8 is supported unidirectionally rotatably to the cylindrical support 61. The braking driving member 8, when the guide pulley 6 normally rotates, freely rotates with respect thereto, and, when it rotates, in reverse rotates integrally therewith. While, the braking driving member 8, when the braking driven member 7 is supported unidirectionally rotatably to the brake actuator 4, is fixed to the cylindrical support 61.

For unidirectionally rotatably supporting the braking driving member 8 or driven member 7, a unidirectional rotating transmitting mechanism, such as a one-way clutch means, is used, which is well-known to be easily understandable. In brief, it is enough to allow the guide pulley 6, only when reversely rotating, to transmit the reversing force caused by back-pedalling, from the braking driving member 8 to the braking driven member 7, thereby reversely rotating the brake actuator 4.

In addition, it is preferable to support the driven member 7 unidirectionally rotatably to the brake actuator 4 and fix the braking driving member 8 to the cylindrical support 61 as shown in FIG. 5.

The braking driven member 7 and driving gears 2 are reversably operable with respect to each other. It is preferable that the driving gears 2 and braking driven member 7, as shown in FIGS. 5 and 6, are supported on the brake actuator 4' through a support cone 17, and between the driving gears 2 and the brake actuator 4' is provided a first unidirectional rotation transmitting mechanism 100 comprising first pawls 101 and first ratchet teeth 102, and between the braking driven member 7 and the brake actuator 4' is provided a second unidirectional rotation transmitting mechanism 200 comprising second pawls 201 and second ratchet teeth 202. Each first pawl 101 and second pawl 201, as shown in FIG. 6, are displaced at an angle of about 170 degrees and connected in association with each other.

The above associated connection includes not only an integral connection of pawls 101 and 201 but also use of connection means by which one pawl 101 or 201 operates and the other 201 or 101 associates therewith.

The pawls 101 and 201 are switched mainly by use of the rotation of braking driven member 7. Holding springs 203, as shown in FIG. 6, are provided at both lateral sides of a tip of each second pawl 201 at the second unidirectional rotation transmitting mechanism 200, and elastically contact with the inner periphery of braking driven member 7, so that contact resistance between the holding springs 203 and the braking driven member 7 allows the second pawls 201 to follow the rotation of braking driven member 7 and mesh with the ratchet teeth thereof. In detail, when the braking driven member 7 normally rotates, each of the second pawls 201 is turned through the holding springs 203 at a given angle away from the second ratchet teeth 202, and when the braking driven member 7 reversely rotates, each second pawl 201 is turned through the holding springs 203 at a given angle in the direction of engaging with the ratchet teeth 202. In the above construction, the hub shell 11 has a tapered face 11a engageable with the clutch cone 31 so that the brake actuator 4, when rotating normally, drives the hub shell 11 through the clutch cone 31.

The transmitting mechanism 9 for transmitting the operation of braking driving member 8 to the braking driven member 7, may use a chain, gear, or interlocking member having pawls.

The transmitting mechanism 9 shown in FIGS. 1 through 4 and 5 employs a chain, in which the braking driven member 7 and braking driving member 8 comprise chain gears and the chain is made endless and stretched across both the members 7 and 8.

In this construction, the chain constituting the transmitting mechanism 9 can be smaller than the driving chain C, so that the reverse rotation of guide pulley 6 caused by back-pedalling may be transmitted from the braking driving member 8 to the braking driven member 7 through the transmitting chain, thereby reversely rotating the brake actuator 4 for exerting the braking action.

Figure 7:
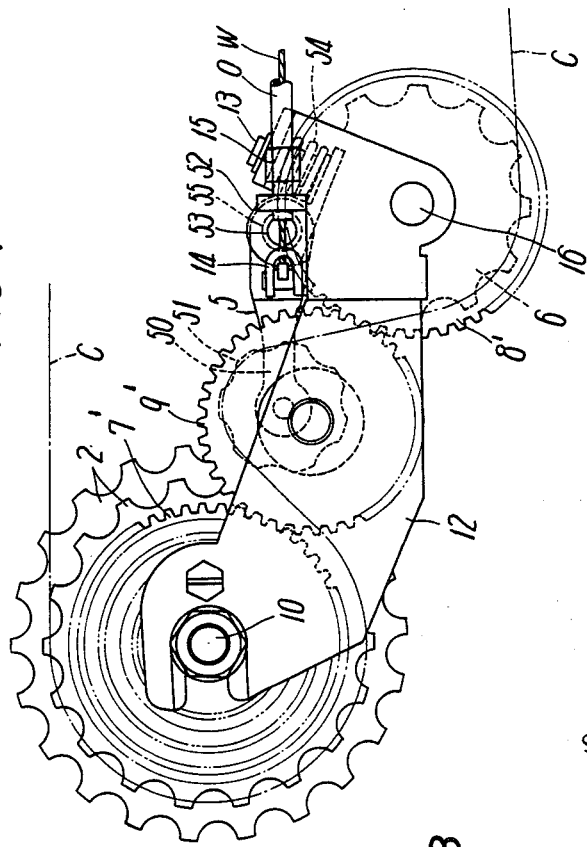
FIG. 7 is a side view, corresponding to FIG. 3, of another modified embodiment of the inveniton.
Figure 8:
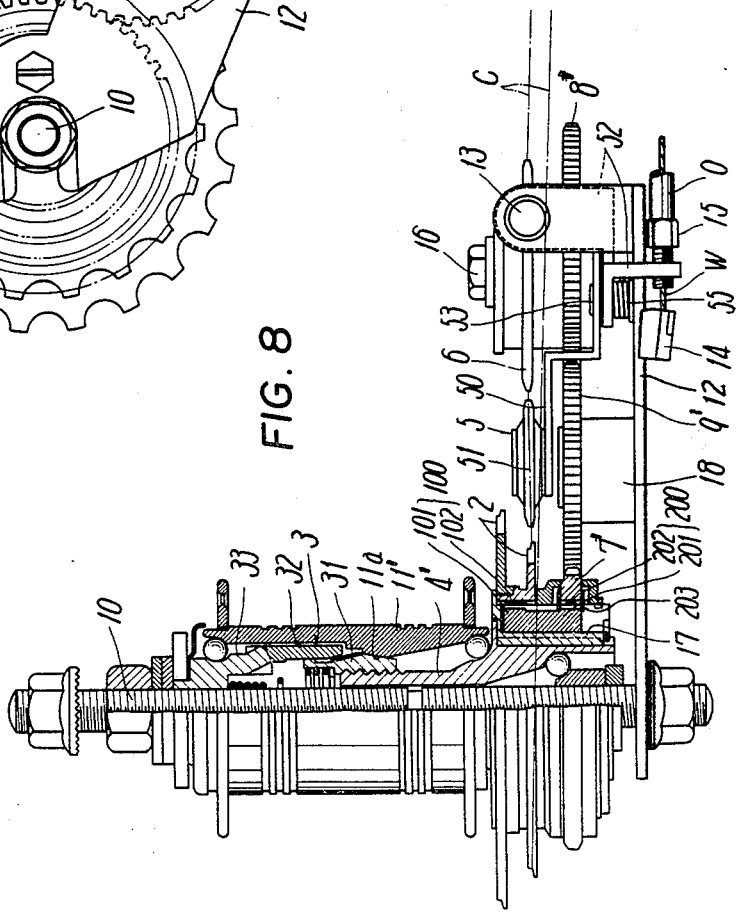
FIG. 8 is a partially cutaway plan view, corresponding to FIG. 4, of the FIG. 7 embodiment.

The transmitting mechanism 9' shown in FIGS. 7 and 8 employs a gear, in which the braking driven member 7' and braking driving member 8' both comprise gears. The gear constituting the mechanism 9' is interposed at an intermediate portion between both the members 7' and 8' and supported rotatably to the fixing member 12 through a support 18.

In this construction, the reverse rotation of guide pulley 6 caused by back-pedalling is transmitted from the braking driving member 8' to the braking driven member 7' through the transmitting gear, thereby ensuring the reverse rotation of brake actuator 4 for exerting the braking effect.

The transmitting mechanism 9" shown in FIGS. 9 through 12 employs an interlocking member, and the braking driven member 7" and braking driving member 8" comprise ratchet wheels respectively, the interlocking member being interposed between both the members 7" and 8".

The interlocking member comprises an elongate plate-like member, has at both lengthwise ends a first pawl 91 engageable with the braking driven member 7" and a second pawl 92 engageable with the braking driving member 8", and is movable in the tangential direction to the braking driving member 8". A spring 93 is provided at the interlocking member to bias it toward the braking driving member 9" so that the second pawl 92 always meshes with the ratchet teeth of braking driving member 8".

In this construction, when the guide pulley 6 reversely rotates by back-pedalling, the interlocking member moves toward the braking driven member 7" and meshes at the first pawl 91 with the ratchet teeth of braking driven member 7", thereby reversely rotating the braking driven member 7". Hence, the brake actuator 4' reversely rotates to exert the braking action as foregoing. The interlocking member moves through a guide groove 94a formed at a guide 94 mounted on the fixing member 12. A stopper 95 is provided at the fixing member 12 so as to restrict the movement of interlocking member biased by the spring 93.

In addition, in FIG. 3, reference numeral 19 designates a chain holder. The chain holder 19, as shown in FIG. 13, has a chain holding face 19a opposite to the outer periphery of guide pulley 6 and is fixed to the cylindrical support 61 through the support shaft 16, thereby being swingable together with the support 61 with respect to the fixing member 12.

In the drive and brake device of the invention constructed as foregoing, the normal rotation of front gear FG by pedalling in the normal direction (clockwise in FIG. 1), is transmitted to the driving gear 2 through the driving chain C, thereby driving the hub shell 11, thus driving the bicycle forward in the prescribed gear ratio, at which time the guide pulley 6 also normally rotates through the chain C.

In the construction shown in FIGS. 3 and 4, the braking driving member 8, when the guide pulley 6 normally rotates, rotates integrally therewith and the braking driven member 7 rotates through the transmitting mechanism 9 to thereby allow the brake actuator 4 to normally rotate. In this instance, the clutch cone 31 merely moves away from the brake shoes 32 and does not exert the braking action.

In the construction shown in FIGS. 5 and 6, the braking driving member 7, when the guide pulley 6 normally rotates, rotates integrally therewith so that the braking driven member 7 normally rotates through the transmitting mechanism 9 of the chain or gear. In this instance, the second pawls 201 at the second transmitting mechanism 200 interposed between the braking driven member 7 and the brake actuator 4', disengage from the second ratchet teeth 202 as described earlier, whereby the braking driven member 7 rotates freely with respect to the brake actuator 4 and the hub shell 11 is driven without hindrance.

When braking is desired, the front gears FG are reversely rotated by back-pedalling so that the reverse rotation of front gear FG is transmitted directly to the guide pulley 6 through the drive chain C and then to the driven member 7, 7' or 7" through the driving member 8, 8' or 8" and transmitting mechanism 9, 9' or 9", whereby the brake actuator 4, or 4' reversely rotates to move the clutch cone 31 toward the brake shoes 32, thus ensuring the braking effect. At this time, the reversing force of front gear FG also is transmitted from the guide pulley 6 to the driving gear 2 through the chain-switching pulley 6 at the derailleur 5. However, the unidirectional rotation transmitting mechanism 21 in the construction shown in FIGS. 3 and 4 and the first unidirectional rotation transmitting mechanism 100 in the construction shown in FIGS. 5 and 7 through 9, allows the driving gears 2 to freely rotate with respect to the hub shell 11, or 11', thereby avoiding interrupting the braking action. Since the reverse rotation of front gear FG is transmitted to the braking driven member 7, 7' or 7" not through the chain-switching pulley 51 according to the, a quick braking action is exerted without delay, the derailleur 5 is not subjected to an excessive force from the forcible swinging motion of changeover cage 50, and no slack is created on the chain C. As a result, when the bicycle is intended to be redriven at the conclusion of the braking effect, no lost motion of the front gear FG and no drop-out of the chain C occurs, and a stable braking action is performable at a constant rotary angle of front gear FG regardless of different gear ratios.

The driving gears 2 in the aforesaid embodiments shown in FIGS. 3 and 4, or 5, 8 and 10, alternatively may be mounted on an axially elongated driving member 220 as shown in FIG. 14. The driving member 220 enters at its one axial end into the hub shell 11 and a driving clutch cone 221 in contact with the inner surface of hub shell 11 is screwed with the outer periphery of the one axial end of driving member 220 so that the normal rotation of front gear FG may be transmitted from the driving member 220 to the hub shell 11 through the clutch cone 221. The reverse rotation of front gear FG for exerting the braking action allows the clutch cone 221 to move axially in one direction (leftwardly in FIG. 14) with respect to the driving member 220, thereby freely rotating the driving gears 2. Such construction including no pawls can thoroughly eliminate locking created during the braking action, without using the construction shown in FIGS. 5 and 6. In detail, the driving member 22, which is supported onto the hub shell 11 through the unidirectional rotation transmitting mechanism 21 comprising the pawls and ratchet teeth as shown in FIG. 4, is locked due to mesh of the pawls with the ratchet teeth upon cessation of the normal rotation of driving gears 2 for the braking action. Hence, even if the bicycle is intended to be redriven after the braking action, it is impossible to normally rotate the driving gears 2. However, use of the driving clutch cone 221 can eliminate the above locking.

As seen from the above, the drive and brake device of the invention is provided with the guide pulley 6 by which the drive chain C is guided to the chain-switching pulley 51 at the derailleur 5 and switched to a desired one of the driving gears 2, and with the braking driving member 8, 8' or 8" rotatable integrally with the guide pulley 6 only when reversely rotated, so that the reverse rotation thereof is transmitted through the transmitting mechanism 9, 9' or 9" to the braking driven member 7, 7' or 7" supported to the brake actuator 4 or 4', thereby reversely rotating the brake actuator for exerting the braking action. Hence, there is no need of providing the braking gear at the front gear FG, and the long braking chain for actuating the braking driven member 7, 7' or 7" as conventional. As a result, the device is simple in construction so that the bicycle is easy to assemble and inexpensive, as a whole, to produce.

On the other hand, the reversing force of front gear FG is transmitted from the guide pulley 6 to the braking driven member 7, 7' or 7" through the braking driving member 8, 8' or 8" and transmitting mechanism 9, 9' or 9", but not through the chain-switching pulley 51 at the derailleur 5, whereby no slack is created on the chain C so as to eliminate lost motion of front gear FG and a drop-out of the chain C therefrom. Furthermore, the reverse rotation of braking driven member 7, 7' or 7" simultaneous with that of the front gear when exerting the braking action, enables a quick braking effect without delay, and a constant rotary angle of the front gear regardless of different gear ratios enables a stable braking action. Also, the derailleur 5 is not subjected to excessive tension as conventional, thereby preventing a breakdown in the same.

Although several embodiments have been described, they are merely exemplary of the invention and not to be construed as limiting, the invention being defined solely by the appended claims.

What is claimed is:

1. A drive and brake device for a bicycle which drives a bicycle rear wheel hub upon normal rotation of the bicycle pedals through a front gear and driving chain, and brakes the rear wheel hub upon a reverse rotation of the bicycle pedals, said device comprising:

a rear wheel hub having a hub shaft, a hub shell supported rotatably to said hub shaft, a coaster brake mechanism housed within said hub shell and including a cylindrical brake actuator and brake shoes, said brake shoes being movable upon rotation of said brake actuator so as to brake rotation of said hub shell; a plurality of driving gears engageable with said chain; at least one transmitting means for transmitting driving force from said driving gears to said hub shell only during normal rotation of said bicycle pedals, and a braking driven member supported to said brake actuator and reversely rotatable upon reverse rotation of said pedals to cause rotation of said brake actuator;

a fixing member;

a derailleur mechanism for guiding said chain axially of said driving gears and switching said chain to one of said driving gears, said derailleur mechanism being supported to said fixing member and having a chain-switching pulley movable axially of said driving gears and a moving means for moving said pulley axially of said driving gears;

a guide pulley supported rotatably to said fixing member for guiding said chain, said chain being stretched from said front gear to said chain-switching pulley and across said guide pulley;

a braking driving member disposed coaxially with said guide pulley and operating upon a reverse rotation of said guide pulley which occurs when said pedals are reversely rotated; and, a transmitting mechanism for transmitting operation of said braking driving member to said braking driven member causing rotation of said brake actuator and resultant actuation of said coaster brake mechanism.

2. A drive and brake device for a bicycle according to claim 1, wherein said braking driven member and braking driving member comprise chain gears respectively, and said transmitting mechanism for transmitting operation of said braking driving member to said braking driven member comprises a chain.

3. A drive and brake device for a bicycle according to claim 2, wherein said braking driven member comprising a chain gear is fixed to said brake actuator and said braking driving member comprising a chain gear is adapted to freely rotate when said peals are normally rotated and to reversely rotate together with said guide pulley only when said pedals are reversibly rotated.

4. A drive and brake device for a bicycle according to claim 2, wherein a unidirectional rotating transmitting mechanism is interposed between said braking driven member comprising a chain gear and said brake actuator carrying said braking member comprising a chain gear, so that said braking driven member is adapted to freely rotate with respect to said brake actuator when said pedals are normally rotated and to rotate integrally with said brake actuator when said pedals are reversely rotated, said braking driving member being integral with said guide pulley.

5. A drive and brake device for a bicycle according to claim 1, wherein said braking driven member and braking driving member comprise gears respectively, and said transmitting mechanism for transmitting operation of said braking drive member to said braking driven member comprises a gear engageable with said gears of said braking driven member and braking driving member.

6. A drive and brake device for a bicycle according to claim 5, wherein said braking driven member comprising a gear is fixed to said brake actuator, and said braking driving member comprising a gear freely rotates when said pedals are normally rotated, and reversely rotates together with said guide pulley only when said pedals are reversely rotated.

7. A drive and brake device for a bicycle according to claim 5, wherein a unidirectional rotating transmitting mechanism is interposed between said braking driven member comprising a gear and said brake actuator carrying said braking driven member comprising a gear, so that said braking driven member is allowed to freely rotate with respect to said brake actuator when said pedals are normally rotated, and rotate integrally with said brake actuator when said pedals are reversely rotated, said braking driving member being integral with said guide pulley.

8. A drive and brake device for a bicycle according to claim 1, wherein said braking driven member and braking driving member comprise ratchet wheels respectively, and said transmitting mechanism transmitting operation of said braking driving member to said braking driven member comprises an interlocking member having first and second pawls engageable with said ratchet wheels respectively, said second pawl at said interlocking member always engaging with said braking driving member so that when said braking driving member reversely rotates, said first pawl moves toward said braking driven member to engage therewith.

9. A drive and brake device for a bicycle according to claim 1, wherein said cylindrical brake actuator is supported rotatably to said hub shaft and carries at one axial end portion said driving gears and braking driven member and at the other axial end portion a clutch cone screwed therewith, so that when said pedals are normally rotated, a driving force from each of said driving gears allows said brake actuator to normally rotate to thereby drive said hub shell through said clutch cone, and when said pedals are reversely rotated, a driving force from said braking driven member allows said brake actuator to reversely rotate to thereby actuate said coaster brake mechanism for exerting the braking action.

10. A drive and brake device for a bicycle according to claim 9, wherein a first unidirectional rotating transmitting mechanism having pawls is interposed between said brake actuator and said braking driven member, and a second unidirectional rotation transmitting mechanism having pawls is interposd between said brake actuator and said driving gears, each of said pawls at one of said transmitting mechanisms being connected in association with each of said pawls at the other, so that when said pedals as normally rotated, said braking driven member freely rotates with respect to said brake actuator, and when said pedals are reversely rotated, said driving gears freely rotate with respect to said brake actuator.

11. A drive and brake device for a bicycle according to claim 10, wherein said pawls at said first transmitting mechanism have holding springs elastically contactable with said braking driven member, so that when said braking driven member reversely rotates upon reverse rotation of said pedals, said pawls are allowed to follow said braking driven member to engage therewith, and said pawls at said second unidirectional rotation transmitting mechanism become inactive.

* * * * *